United States Patent
Schultz et al.

(10) Patent No.: US 8,561,878 B2
(45) Date of Patent: Oct. 22, 2013

(54) LINEAR CELL STRINGING

(75) Inventors: David Sheldon Schultz, Berkeley, CA (US); John Hunter Mack, Oakland, CA (US); Kenneth Evan Rakestraw, Berkeley, CA (US)

(73) Assignee: Banyan Energy, Inc., Berkeley, CA (US)

( * ) Notice: Subject to any disclaimer, the term of this patent is extended or adjusted under 35 U.S.C. 154(b) by 0 days.

(21) Appl. No.: 13/246,460

(22) Filed: Sep. 27, 2011

(65) Prior Publication Data

US 2012/0080508 A1 Apr. 5, 2012

Related U.S. Application Data

(60) Provisional application No. 61/404,131, filed on Sep. 27, 2010.

(51) Int. Cl.
*B23K 31/02* (2006.01)
*B23K 37/00* (2006.01)

(52) U.S. Cl.
USPC .... 228/179.1; 228/49.1; 228/49.5; 228/180.5

(58) Field of Classification Search
None
See application file for complete search history.

(56) References Cited

U.S. PATENT DOCUMENTS

| | | | | |
|---|---|---|---|---|
| 4,154,998 A * | 5/1979 | Luft et al. | | 219/633 |
| 4,334,354 A * | 6/1982 | Luft et al. | | 29/840 |
| 5,839,640 A * | 11/1998 | Kinnaird | | 228/4.5 |
| 5,961,737 A * | 10/1999 | Glenn | | 136/244 |
| 6,196,445 B1 * | 3/2001 | Fogal et al. | | 228/180.5 |
| 6,360,497 B1 * | 3/2002 | Nakazima et al. | | 52/173.3 |
| 6,441,297 B1 * | 8/2002 | Keller et al. | | 136/249 |
| 7,677,431 B2 * | 3/2010 | Wong et al. | | 228/179.1 |
| 8,020,290 B2 * | 9/2011 | Sheats | | 29/842 |
| 2003/0006730 A1 * | 1/2003 | Tachibana | | 320/101 |
| 2003/0047206 A1 * | 3/2003 | Kawam | | 136/244 |
| 2003/0127124 A1 * | 7/2003 | Jones et al. | | 136/244 |
| 2004/0200522 A1 * | 10/2004 | Fukawa et al. | | 136/259 |
| 2005/0217718 A1 * | 10/2005 | Dings et al. | | 136/256 |
| 2006/0213548 A1 * | 9/2006 | Bachrach et al. | | 136/251 |
| 2006/0283496 A1 * | 12/2006 | Okamoto et al. | | 136/244 |
| 2007/0235077 A1 | 10/2007 | Nagata et al. | | |
| 2007/0283995 A1 * | 12/2007 | Okamoto et al. | | 136/244 |
| 2007/0283997 A1 * | 12/2007 | Hachtmann et al. | | 136/244 |
| 2008/0048007 A1 * | 2/2008 | Chikaki | | 228/101 |
| 2009/0014049 A1 * | 1/2009 | Gur et al. | | 136/244 |
| 2009/0056784 A1 * | 3/2009 | Reinisch | | 136/244 |
| 2009/0077805 A1 * | 3/2009 | Bachrach et al. | | 29/890.033 |
| 2009/0188603 A1 * | 7/2009 | Haller et al. | | 156/64 |
| 2009/0308430 A1 | 12/2009 | Everett et al. | | |
| 2010/0037932 A1 * | 2/2010 | Erez et al. | | 136/244 |

(Continued)

OTHER PUBLICATIONS

DERWENT-ACC-No. 2005-633619 corresponds to JP-2005-243837A (published 2005).*

*Primary Examiner* — Kiley Stoner
(74) *Attorney, Agent, or Firm* — Van Pelt, Yi & James LLP (57) ABSTRACT

Techniques for linear cell stringing are disclosed. In some embodiments, a plurality of sets of solar cells are linearly positioned, a plurality of tabbing ribbon segments are placed in contact with the plurality of sets of solar cells, and the plurality of sets of solar cells and corresponding plurality of tabbing ribbon segments are soldered together to form a plurality of solar cell strings. In some cases, the plurality of solar cell strings is substantially simultaneously formed in parallel.

31 Claims, 11 Drawing Sheets

(56) References Cited

U.S. PATENT DOCUMENTS

| | | | |
|---|---|---|---|
| 2010/0047954 A1* | 2/2010 | Su et al. ........................ 438/61 |
| 2010/0147364 A1* | 6/2010 | Gonzalez et al. ............ 136/251 |
| 2010/0181011 A1* | 7/2010 | Hashimoto et al. .......... 156/166 |
| 2011/0017281 A1* | 1/2011 | Funakoshi et al. ........... 136/251 |
| 2011/0018565 A1* | 1/2011 | Yiang et al. .............. 324/754.03 |
| 2011/0031225 A1* | 2/2011 | No et al. .................... 219/121.64 |
| 2011/0048491 A1* | 3/2011 | Taira ........................... 136/244 |
| 2011/0048492 A1* | 3/2011 | Nishiwaki ................... 136/244 |
| 2011/0056532 A1* | 3/2011 | Ravi et al. ................... 136/244 |
| 2011/0065226 A1* | 3/2011 | Luo et al. ....................... 438/67 |
| 2011/0155790 A1* | 6/2011 | Reinisch ...................... 228/44.7 |
| 2011/0265844 A1* | 11/2011 | Storbeck et al. ............. 136/244 |
| 2011/0290299 A1* | 12/2011 | Kyoda et al. ................ 136/244 |
| 2011/0300664 A1* | 12/2011 | Chung ............................ 438/80 |
| 2011/0308567 A1* | 12/2011 | Chung .......................... 136/244 |
| 2011/0316343 A1* | 12/2011 | Krauser et al. ................. 307/77 |
| 2012/0042925 A1* | 2/2012 | Pfennig ........................ 136/244 |
| 2012/0080507 A1* | 4/2012 | Luechinger et al. ....... 228/110.1 |
| 2012/0085812 A1* | 4/2012 | Luechinger et al. ....... 228/110.1 |
| 2012/0103408 A1* | 5/2012 | Moslehi et al. .............. 136/256 |
| 2012/0125412 A1* | 5/2012 | Hong et al. .................. 136/252 |
| 2012/0214271 A1* | 8/2012 | Ishii et al. ...................... 438/80 |

\* cited by examiner

LINEAR CELL STRINGING

CROSS REFERENCE TO OTHER APPLICATIONS

This application claims priority to U.S. Provisional Patent Application No. 61/404,131 entitled LINEAR CELL STRINGING filed Sep. 27, 2010 which is incorporated herein by reference for all purposes.

BACKGROUND OF THE INVENTION

Tabbing and stringing of solar cells is typically done using machines or by hand. Conventional tabbing and stringing machines are configured to handle large solar cells and are not easily adapted for use with other cell geometries. Cell tabbing and stringing by hand introduces potentially damaging thermal stresses and is less reliable in terms of repeatability. Thus, it would be useful to improve existing tabbing and stringing techniques.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

Solar energy modules are employed for applications such as concentrated photovoltaic electricity generation and fluid heating. Various techniques associated with linear cell stringing in solar modules are disclosed herein. The disclosed techniques may be employed in the construction of modules in which solar cells are selectively positioned to take advantage of concentrating or reflecting optics. The disclosed techniques are agnostic with respect to concentration method, installation method, and cell spacing and provide design benefits such as cell string geometry repeatability, reduction of thermal stresses, reduction of residual stresses, and enabling of continuous process manufacturing.

Figure 1A:
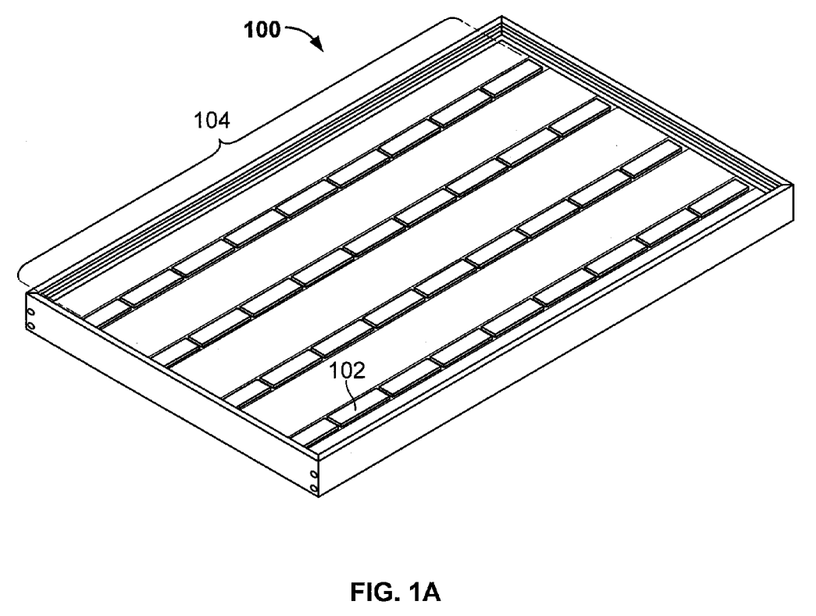
FIG. 1A illustrates an embodiment of an isometric view of a portion of a concentrator photovoltaic module with linearly arranged solar cells.
Figure 1B:
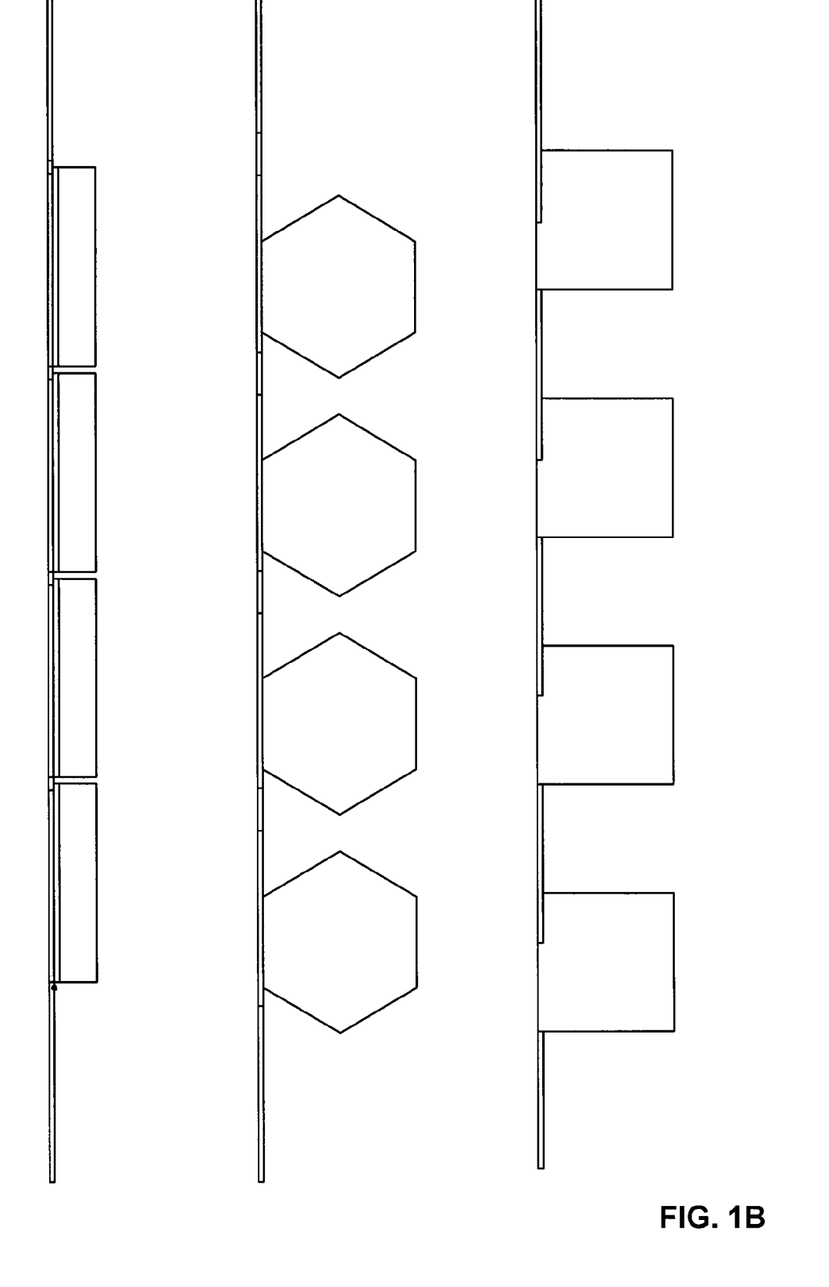
FIG. 1B illustrates embodiments of solar cell strings having cells of various geometries.

FIG. 1A illustrates an embodiment of an isometric view of a portion of a concentrator photovoltaic module 100 with linearly arranged solar cells such as solar cell 102. As depicted, concentrator photovoltaic module 100 comprises a plurality of linearly arranged solar cell strings such as solar cell string 104. In various embodiments, solar cells having any appropriate geometry may be employed in a solar module. FIG. 1B illustrates embodiments of solar cell strings having cells of various geometries.

Figure 2A:
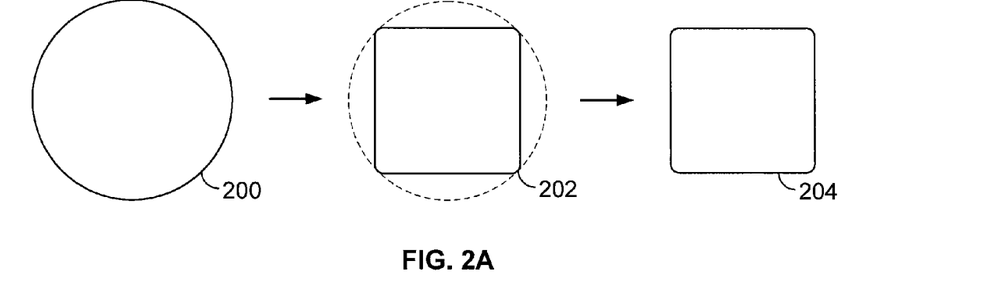
FIG. 2A illustrates an embodiment of cutting a wafer into a solar cell.

Current industry standard monocrystalline solar cells are typically fabricated from a circular silicon wafer having a diameter of approximately 200 mm. FIG. 2A illustrates an embodiment of cutting a wafer into a solar cell. As depicted, circular wafer 200 is cut 202 into cell 204. In the example of FIG. 2A, cell 204 comprises a pseudo-square, i.e., a square with rounded corners. Such a pseudo-square geometry in some cases facilitates increased packaging efficiency of typical solar cells when placed in a solar module.

For concentrator applications, a wafer may be diced into a geometry compatible with the concentrator optic focal area. The dimensions of such diced cells may be selected to optimize wafer utilization. Wafer utilization is defined as the percentage of a wafer which yields useful solar cells. Waste in this context is defined as the percentage of a wafer that is not utilized as part of the finished solar cell because of geometric incompatibility with the focal area, kerf loss, or damage due to handling.

Figure 2B:
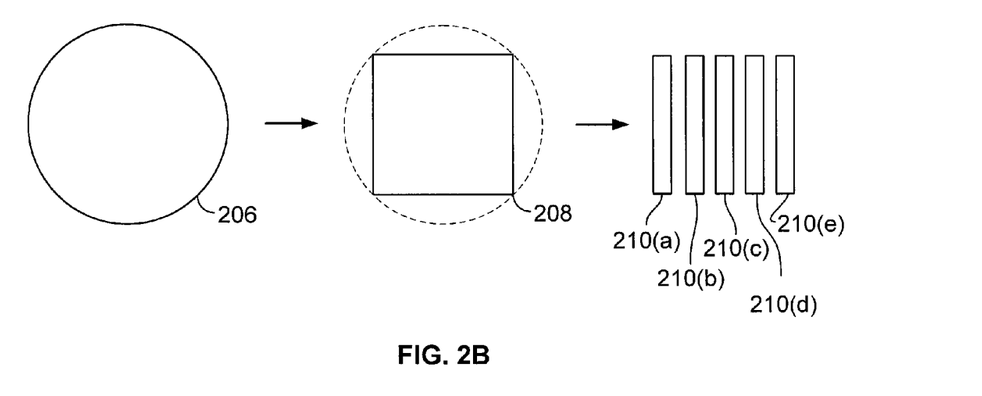
FIG. 2B illustrates an embodiment of cutting and dicing a wafer into a plurality of solar cells.

FIG. 2B illustrates an embodiment of cutting and dicing a wafer into a plurality of solar cells. As depicted, circular wafer 206 is cut into fully inscribed square section 208, which is then diced into a plurality of solar cells 210(a)-(e). In this example, the length of each diced solar cell 210 is the length of a fully inscribed square of the wafer. This length is partially wafer dependent since it is driven by the diameter of the wafer itself as well as optimized wafer utilization. For instance, a 200 mm diameter circular wafer has an inscribed square dimension of approximately 141 mm, resulting in diced solar cells having a length of approximately 141 mm. The width of each solar cell 210 may be chosen to yield integer numbers of diced cells from square 208 to minimize wafer wastage.

Figure 3:
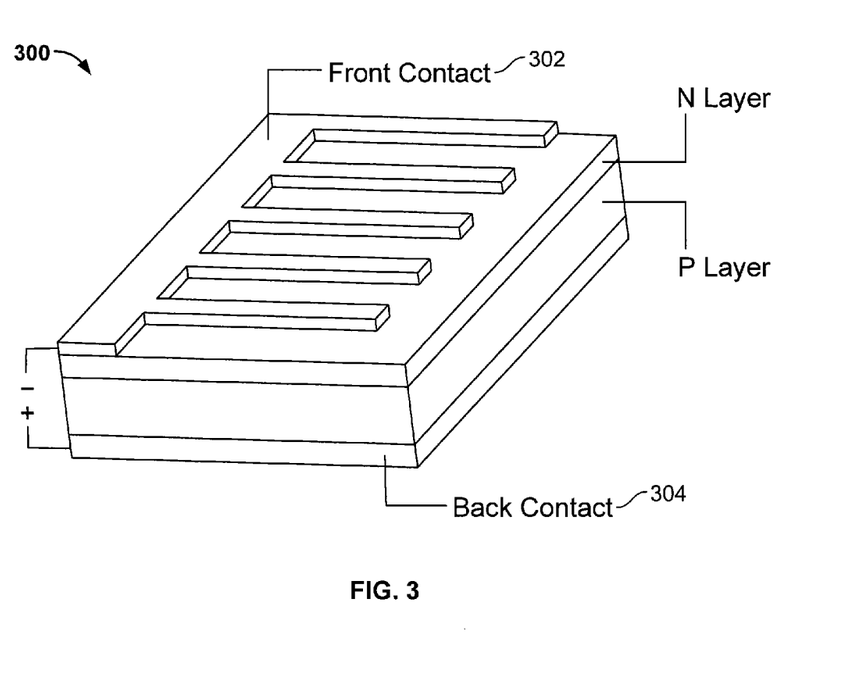
FIG. 3 illustrates an embodiment of a front contact cell.

As further described below, various techniques may be employed to connect a plurality of solar cells into strings, such as solar cell string 104 of FIG. 1A. Strings are defined as an array of solar photovoltaic cells connected using electrically conductive tabbing ribbon. The tabbing ribbon may be bound to the cells by soldering. The disclosed stringing techniques may be employed with respect to different geometries of cells as described above. Moreover, the disclosed stringing techniques may be employed with respect to any appropriate cell architectures, cell orientations (e.g., vertical or horizontal), cell spacings, etc. For example, the disclosed stringing techniques may be employed with respect to different solar cell contact configurations, such as front contact and back contact configurations. FIG. 3 illustrates an embodiment of a front contact cell 300. As depicted, a front contact or bifacial cell configuration includes a front contact 302 on the top or front side of the cell as well as a back contact 304 on the bottom or back side of the cell. In contrast, a back contact cell configuration includes both anode and cathode contacts on the bottom or back side of the cell.

Figure 4:
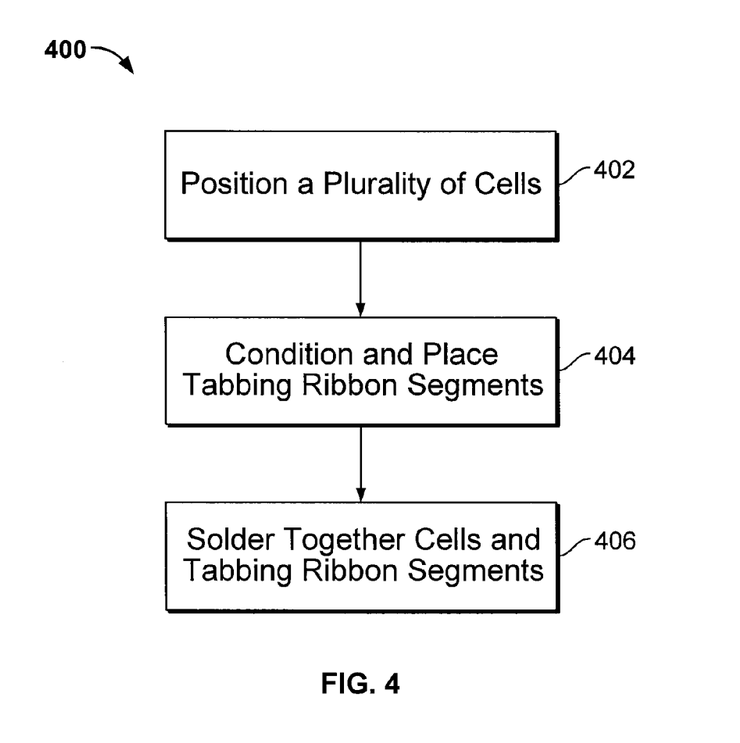
FIG. 4 illustrates an embodiment of a process for stringing a plurality of solar cells.

FIG. 4 illustrates an embodiment of a process for stringing a plurality of solar cells. For example, process 400 may be employed to create a cell string such as solar cell string 104 of FIG. 1A. In various embodiments, process 400 may at least in part be automated and/or parallelized. Process 400 starts at step 402 at which a plurality of solar cells are properly positioned. In some embodiments, cells are arranged in a linear fashion along a common plane or surface with repeatable spacing to facilitate the formation of a reliable linear string. Linearly aligning cells in two axial directions serves to prevent translational and rotational misalignment on a cell-by-cell basis and holds cells in place for soldering. The positioning of cells in the transverse direction controls cell spacing, which is defined by the distance between adjacent cells. Any appropriate cell spacing may be selected in various embodiments. In some cases, a cell spacing that easily allows cell space repeatability and is amenable to changes in spacing in a design may be selected. In various embodiments, the cell arrangement and spacing of step 402 may be selected based on design considerations such as positioning active cell areas in the most efficient locations for electricity generation and reducing stresses such as at soldering joints.

At step 404, the tabbing ribbon used to string cells is conditioned and placed. Conditioning the tabbing ribbon includes pre-forming or shaping the tabbing ribbon, as applicable, to accommodate or fit a cell profile and facilitate easier soldering. In some embodiments, a bend may be introduced into a tabbing ribbon segment, e.g., to provide strain relief. Pre-conditioned tabbing ribbon segments are then appropriately placed next to the cells to which they are to be soldered. At step 406, the cells and tabbing ribbon segments are bonded via soldering, resulting in a cell string. That is, a cell string is formed at step 406 by soldering the cells and tabbing ribbon segments positioned at steps 402 and 404. Soldering step 406 not only completes the electrical connection between cells and corresponding ribbon segments but also provides structural support for the string as a whole to preserve alignment during later module assembly steps.

Figure 5A:
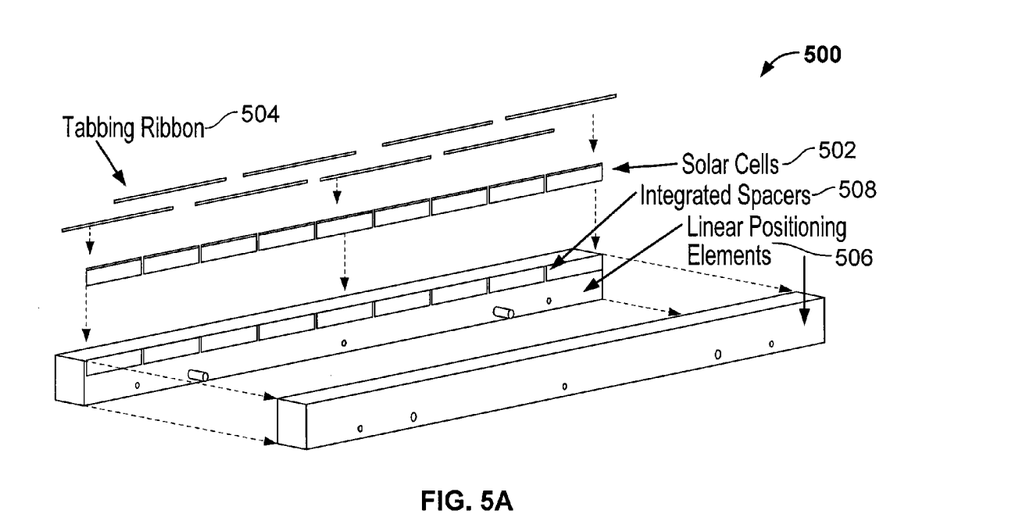
FIGS. 5A-5B illustrate an embodiment of a cell positioning fixture or tool in exploded and assembled views, respectively.
Figure 5B:
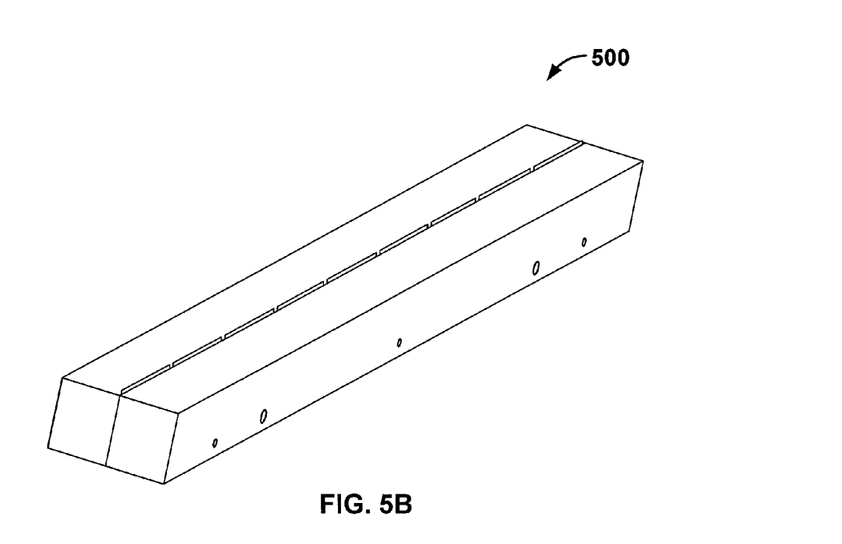
Figure 5C:
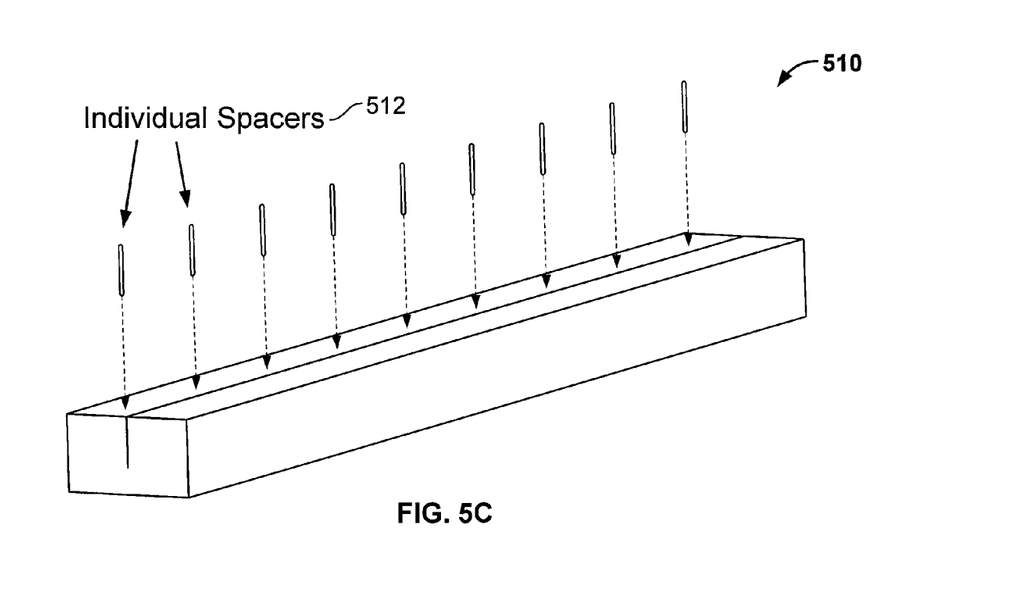
FIGS. 5C-5D illustrate embodiments of some other cell positioning fixture configurations.
Figure 5D:
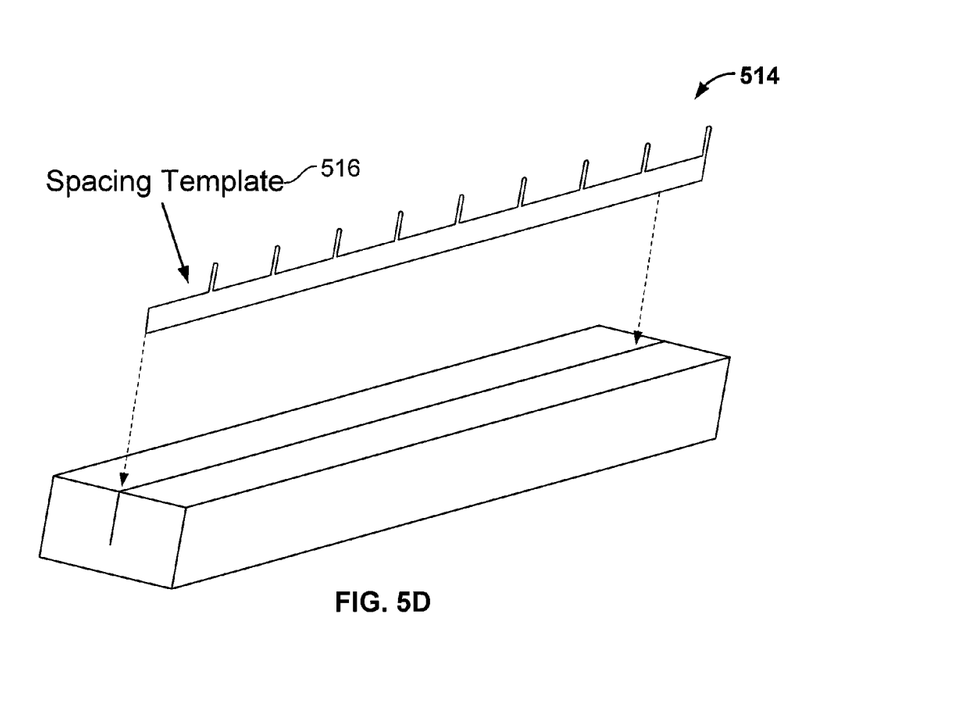

FIGS. 5A-5B illustrate an embodiment of a cell positioning fixture or tool in exploded and assembled views, respectively. In some embodiments, alignment fixture 500 may be employed at step 402 of process 400 of FIG. 4. As depicted in FIG. 5A, fixture 500 facilitates the arrangement of cells 502 and tabbing ribbon segments 504. Fixture 500 comprises linear positioning elements 506 which include slots into which cells 502 can be loaded for proper placement before soldering. In the example given in FIG. 5A, a desired cell spacing in achieved via integrated spacers 508. FIG. 5B illustrates fixture 500 in an assembled view. FIGS. 5A-5B illustrate one configuration of an alignment fixture. In other embodiments, any appropriate fixture configuration may be employed. FIGS. 5C-5D illustrate embodiments of some other cell positioning fixture configurations. In the embodiment of FIG. 5C, fixture 510 includes a machined groove into which individual spacers 512 are inserted. In the embodiment of FIG. 5D, fixture 514 includes a linear cavity into which spacing template 516 is inserted. Each of the fixtures of FIGS. 5A-5D provides a datum surface on which cells can be properly linearly positioned.

Figure 6A:
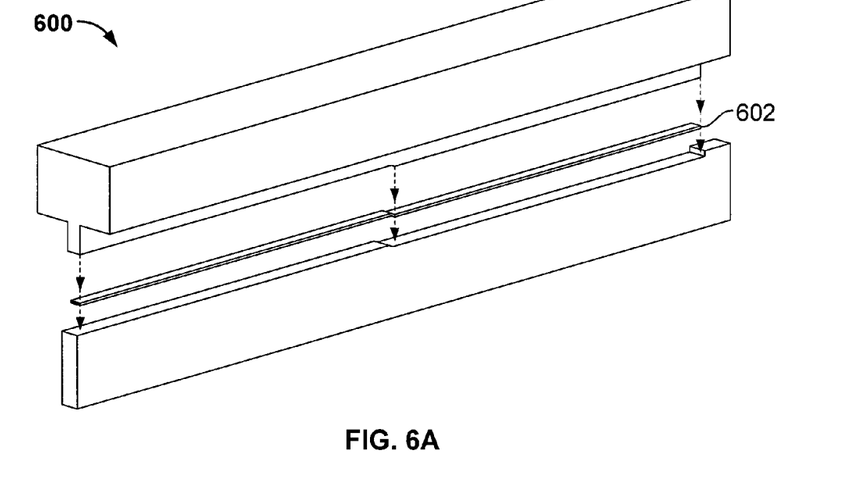
FIGS. 6A-6B illustrate embodiments of mechanisms for ribbon conditioning.
Figure 6B:
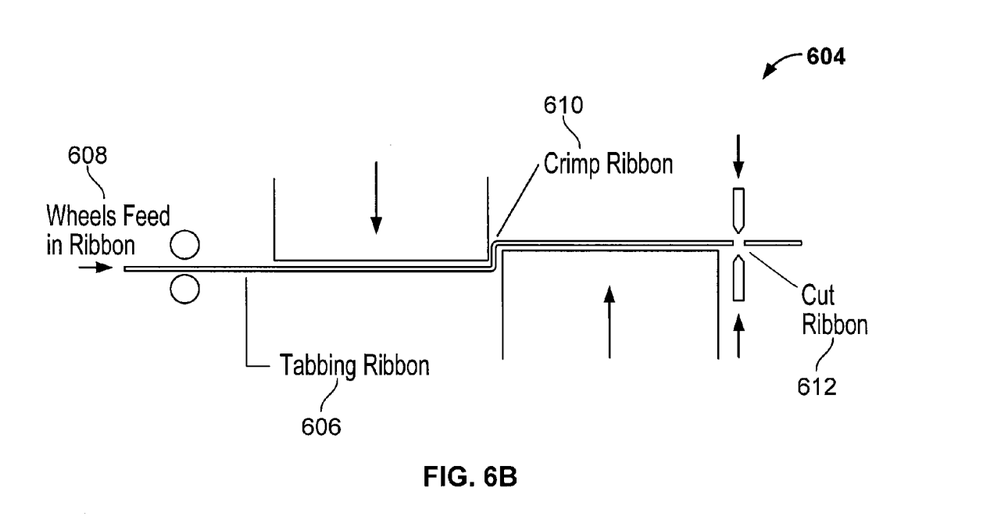

FIGS. 6A-6B illustrate embodiments of mechanisms for ribbon conditioning. In some embodiments, the apparatuses of FIGS. 6A-6B may be employed at step 404 of process 400 of FIG. 4. In various embodiments, ribbon conditioning may include ribbon bending and/or cutting. In the embodiment of FIG. 6A, bending template 600 is employed to form each ribbon segment 602, e.g., via a static process. In the embodiment of FIG. 6B, bi-directional crimping apparatus 604 facilitates a continuous, automated process for forming ribbon segments. As depicted in FIG. 6B, a spool of tabbing ribbon 606 is fed by wheels 608, crimped 610, and cut 612 to form ribbon segments. In some embodiments, ribbon crimping or bending is needed for front contact cell configurations but not for back contact cell configurations.

Figure 7A:
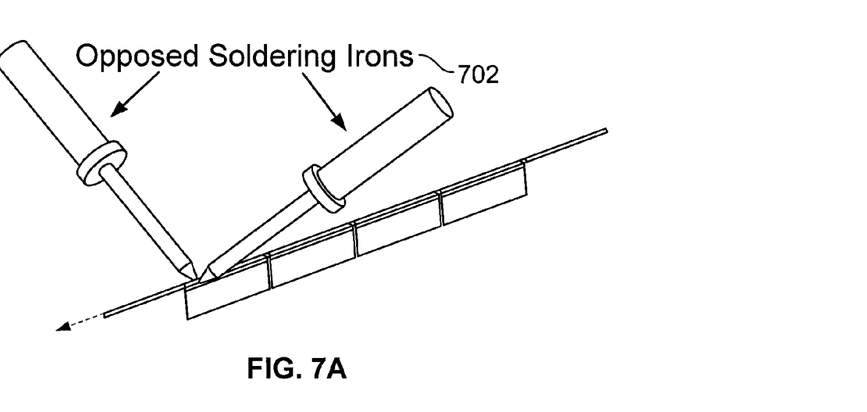
FIGS. 7A-7C illustrate embodiments for soldering cells and tabbing ribbon segments together to form a string.
Figure 7B:
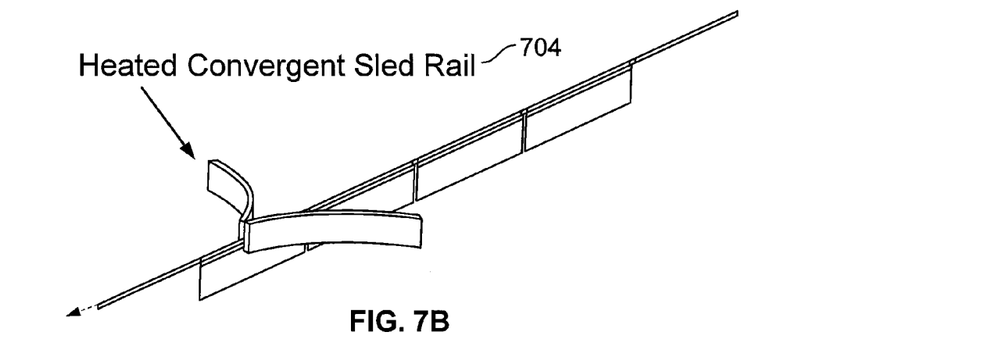
Figure 7C:
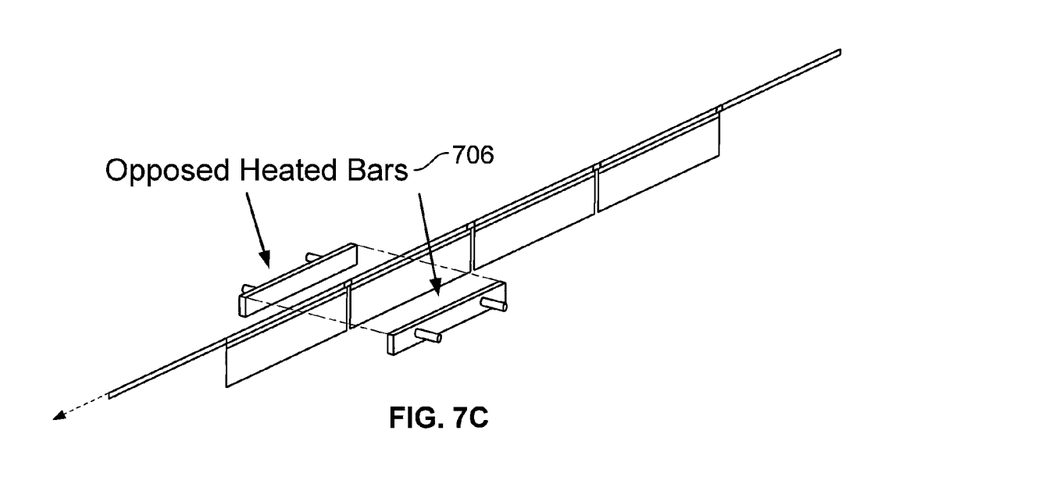

FIGS. 7A-7C illustrate embodiments for soldering cells and tabbing ribbon segments together to form a string. In some embodiments, the techniques depicted in FIGS. 7A-7C may be employed at step 406 of process 400 of FIG. 4. In the embodiments of FIGS. 7A-7C, heat is applied to both sides of the interface between a cell and a tabbing ribbon segment to produce a more uniform heat gradient in order to avoid residual stresses that would otherwise remain after a non-symmetric thermal load. Solar cells are prone to bend or break due to internal stresses due to their brittle nature, so it is desirable to avoid or minimize such stresses to the extent possible. In the embodiment of FIG. 7A, soldering irons 702 are positioned at opposing angles at the ribbon/cell interface. In the embodiment of FIG. 7B, cells and ribbon segments are fed through a heated convergent sled rail 704. In the embodiment of FIG. 7C, opposing heated bars 706 are employed to solder the cells and tabbing ribbon segments.

Figure 8:
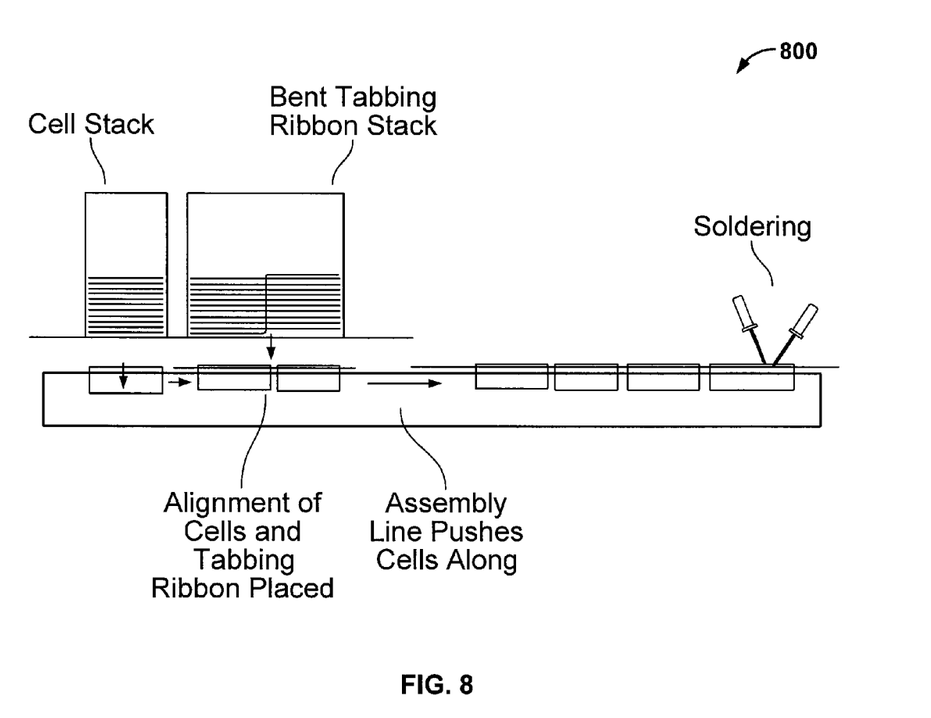
FIG. 8 illustrates an embodiment of an automated system for forming cell strings.

In some embodiments, one or more of the steps of the cell stringing process may be performed as an automated process. For example, one or more steps of process 400 of FIG. 4 may at least in part be automated. FIG. 8 illustrates an embodiment of an automated system 800 for forming cell strings. In some embodiments, system 800 comprises a tabbing and stringing device. In the example of FIG. 8, cells are introduced into a conveyor system 800 comprising positioning fixtures (such as those described with respect to FIGS. 5A-5D), aligned with tabbing ribbon segments (pre-conditioned, for example, using an apparatus such as those described with respect to FIGS. 6A-6B), and soldered (for example, using the techniques described with respect to FIGS. 7A-7C). An automated, high throughput system such as system 800 facilitates production of cell strings of variable lengths in a (nearly) continuous manner. In some cases, dummy cells constructed with a non-solderable material such as ceramic may be introduced into the unused cell stack in order to mark the end of particular strings.

As described above, one or more steps of the cell stringing process may be performed by a tabbing and stringing machine or device such as system 800 of FIG. 8. In this context, tabbing refers to attaching a ribbon segment onto a cell, and stringing refers to attaching a cell to the tab of an adjacent cell to form a string.

Figure 9A:
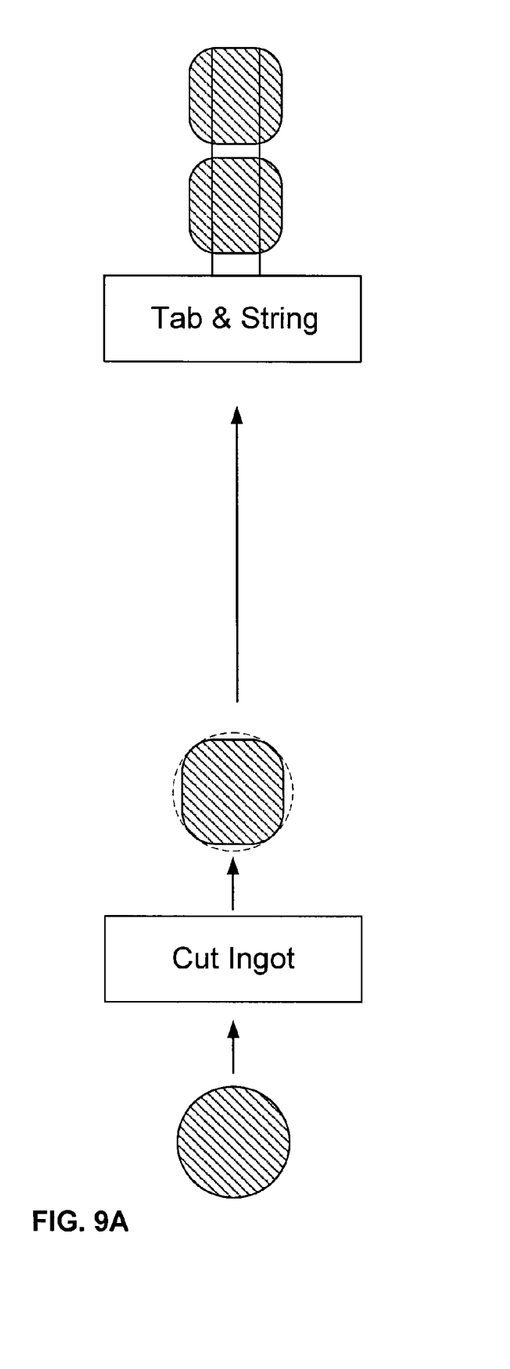
FIG. 9A illustrates an example of the manner in which a cell string is typically formed.

Conventional automated tabbing and stringing machines operate on traditionally-sized cells, such as cell 204 of FIG. 2A. Such devices accept a single full sized cell (e.g., a pseudo-square cut from a full sized wafer) at a time. FIG. 9A illustrates an example of the manner in which a cell string is typically formed. As depicted, individual cells are passed through a tabbing and stringing machine and strung in series.

Figure 9B:
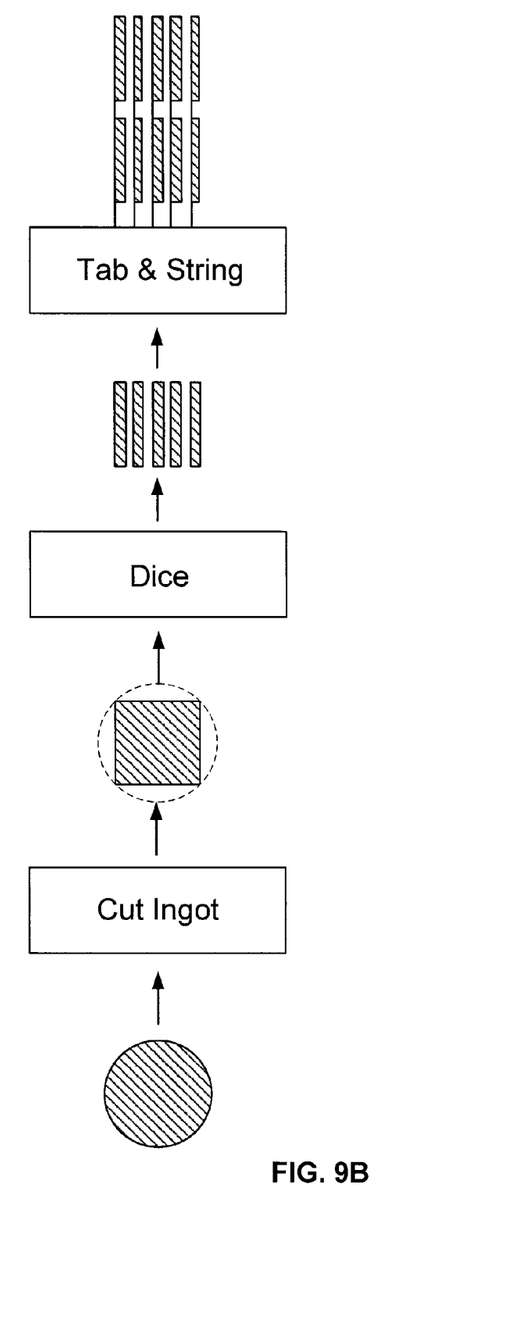
FIG. 9B illustrates an embodiment of parallelizing cell stringing.

In some embodiments, one or more steps of the cell stringing process may be substantially simultaneously performed in parallel. Using diced cells (such as cells 210 of FIG. 2B) offers an opportunity for capital efficiency improvements with respect to the output of a tabbing and stringing machine (e.g., in terms of Watts/day). A significant advantage in terms of capital efficiency and throughput can be gained by processing multiple diced cells in parallel since the cells themselves are small enough to be placed side-by-side and sent through a tabbing and stringing machine. FIG. 9B illustrates an embodiment of parallelizing cell stringing. In the given example, multiple diced cell strings are strung in parallel using a single tabbing and stringing machine. In some embodiments, a customized tabbing and stringing machine may be employed to accommodate parallel processing. In some cases, the addition of more carriages suitable for locating and conveying smaller cells, more tabbing ribbon spools, more spool guides, and other hardware enables a conventional tabbing and stringing machine to be customized for higher throughput parallel processing. Such items present an added cost which is fractional compared to the cost of entirely new processing equipment such that the capital efficiency improvement is approximately equivalent to the level of concentration. Currently, however, practical limits to this parallel processing approach exist. In many cases, the approach is constrained by interference caused by the proximity of ribbon spools, guides, and soldering heads. For instance, achieving a cell width below 9 mm requires a move towards non-standard tabber-stringer components that are narrower and more costly due to customization. However, the aforementioned benefits of parallel processing may be attained with larger cell widths (e.g., in the range of 9-50 mm).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   linearly positioning a plurality of sets of solar cells, wherein each of the plurality of sets of solar cells is linearly positioned using an alignment fixture and wherein a prescribed cell spacing is facilitated via integrated spacers or a spacing template in the alignment fixture;
   placing a plurality of tabbing ribbon segments in contact with the plurality of sets of solar cells; and
   soldering the plurality of sets of solar cells and corresponding plurality of tabbing ribbon segments to simultaneously form a plurality of solar cell strings in parallel.

2. The method of claim 1, wherein the geometry of a solar cell is compatible with a concentrator optic focal area.

3. The method of claim 1, wherein a solar cell comprises a diced portion of a fully inscribed square of a circular semiconductor wafer.

4. The method of claim 1, wherein the length of a solar cell is approximately the length of a fully inscribed square of a circular wafer.

5. The method of claim 1, wherein a solar cell is approximately 141 mm in length.

6. The method of claim 1, wherein the width of a solar cell is within a range of approximately 9 mm-50 mm.

7. The method of claim 1, wherein a solar cell comprises a front contact configuration.

8. The method of claim 1, wherein a solar cell comprises a back contact configuration.

9. The method of claim 1, wherein the sets of solar cells are vertically positioned.

10. The method of claim 1, wherein the sets of solar cells are horizontally positioned.

11. The method of claim 1, wherein the tabbing ribbon segments are pre-conditioned.

12. The method of claim 1, wherein a tabbing ribbon segment includes a bend.

13. The method of claim 1, wherein the plurality of solar cell strings is strung in parallel using a single tabbing and stringing machine.

14. The method of claim 1, wherein soldering comprises employing opposing heated bars to solder each set of solar cells and corresponding tabbing ribbon segments.

15. A method, comprising:
   linearly positioning a plurality of sets of solar cells;
   placing a plurality of tabbing ribbon segments in contact with the plurality of sets of solar cells; and
   soldering the plurality of sets of solar cells and corresponding plurality of tabbing ribbon segments to simultaneously form a plurality of solar cell strings in parallel, wherein soldering comprises feeding each set of solar cells and corresponding tabbing ribbon segments through a heated convergent sled rail.

16. The method of claim 15, wherein the geometry of a solar cell is compatible with a concentrator optic focal area.

17. The method of claim 15, wherein a solar cell comprises a diced portion of a fully inscribed square of a circular semiconductor wafer.

18. The method of claim 15, wherein the length of a solar cell is approximately the length of a fully inscribed square of a circular wafer.

19. The method of claim 15, wherein a solar cell is approximately 141 mm in length.

20. The method of claim 15, wherein the width of a solar cell is within a range of approximately 9 mm-50 mm.

21. The method of claim 15, wherein a solar cell comprises a front contact configuration.

22. The method of claim 15, wherein a solar cell comprises a back contact configuration.

23. The method of claim 15, wherein the sets of solar cells are vertically positioned.

24. The method of claim 15, wherein the sets of solar cells are horizontally positioned.

25. The method of claim 15, wherein the tabbing ribbon segments are pre-conditioned.

26. The method of claim 15, wherein a tabbing ribbon segment includes a bend.

27. The method of claim 15, wherein the plurality of solar cell strings is strung in parallel using a single tabbing and stringing machine.

28. The method of claim 15, wherein linearly positioning a plurality of sets of solar cells comprises arranging cells comprising each of the plurality of sets along a common plane with repeatable spacing.

29. The method of claim 15, wherein the plurality of sets of solar cells and corresponding plurality of tabbing ribbon segments are positioned using alignment fixtures.

30. The method of claim 15, wherein each of the plurality of sets of solar cells is linearly positioned using an alignment fixture.

31. The method of claim 30, wherein a prescribed cell spacing is facilitated via integrated spacers or a spacing template in the alignment fixture.

* * * * *